United States Patent [19]

Nishiii et al.

[11] Patent Number: 4,708,942

[45] Date of Patent: Nov. 24, 1987

[54] CHALCOGENIDE GLASS

[75] Inventors: Junji Nishiii; Takashi Yamagishi, both of Osaka, Japan

[73] Assignee: Nippon Sheet Glass Co., Ltd., Osaka, Japan

[21] Appl. No.: 941,210

[22] Filed: Dec. 12, 1986

[30] Foreign Application Priority Data

Dec. 16, 1985 [JP] Japan .................................. 60-282659

[51] Int. Cl.$^4$ ................................................ C03C 3/32
[52] U.S. Cl. ...................................................... 501/40
[58] Field of Search ............................................ 501/40

[56] References Cited

U.S. PATENT DOCUMENTS

| | | | |
|---|---|---|---|
| 3,348,045 | 10/1967 | Brau et al. | 501/40 |
| 3,440,068 | 4/1969 | Patterson et al. | 501/40 |
| 3,453,583 | 7/1969 | Shanefield et al. | 501/40 |
| 3,498,930 | 3/1970 | Shanefield et al. | 501/40 |
| 3,511,993 | 5/1970 | Patterson | 501/40 |
| 3,790,250 | 2/1974 | Mitchell et al. | 501/40 |

FOREIGN PATENT DOCUMENTS 59-88338  5/1984  Japan .................................. 501/40

Primary Examiner—Mark L. Bell
Attorney, Agent, or Firm—Wenderoth, Lind & Ponack

[57] ABSTRACT

A chalcogenide glass having the following composition in atomic %:
Tl: 0.5–47
Ge: 5–41
Se: 2–58
Te: 5–75
Tl+Ge+Se+Te: at least 80%.

3 Claims, 4 Drawing Figures

CHALCOGENIDE GLASS

This invention relates to a chalcogenide glass which is stable against crystallization and suitable as a material for infrared fibers having excellent infrared transmission characteristics.

It is well known that chalcogenide glass is an infrared-transmitting material having excellent weatherability, and is used as a material for windows of various optical devices and instruments in the infrared region. In recent years, many works have been reported on the use of the chalcogenide glass as a material for infrared fibers. The infrared fibers have applications as a wave guide for $CO_2$ laser (wavelength 10.6 micrometers) energy and a guide passage for radiation thermometers, for example. For such applications, the wavelength of the infrared absorption edge of this material should be at least 10.6 micrometers.

The chalcogens include sulfur (S), selenium (Se) and tellurium (Te). Glass containing S as the chalcogen component has excellent resistance to crystallization, but the wavelength of the multiphonon absorption edge of this glass is at most 8 micrometers. The reason is that since S has a low atomic weight (32.1), absorption of the glass due to lattice vibration occurs in a short wavelength region. Arsenic sulfide ($As_2S_3$) glass fibers have been made on a trial basis, but these glass fibers can be used within a wavelength region of only 2 to 6 micrometers (see, for example, T. Miyashita and Y. Terunuma, Jap. J. Applied Physics, Vol. 21, 1982, pp. L75–L76).

As-Se, As-Se-Te, Ge-Se and Ge-Se-Te glasses containing Se (atomic weight: 79.0) and Te (atomic weight: 127.6) having a higher atomic weight than S are also known. However, As-containing glass systems generally have a lower softening point than Ge-containing glass systems by about 100° C., and because of the strong toxicity of As, the As-containing glass systems are not practical. Furthermore, since the tail of the multiphonon absorpiton edge of the Ge-Se glass extends to a wavelength region less than 10 micrometers, it is difficult to reduce the transmission loss of fibers made from it in a wavelength region of more than 10 micrometers (see, for example, Proceedings of the Spring Meeting of the Institute of Electronics Communication Engineers of Japan No. 1132, 1985).

The Ge-Se-Te glass is known to have a relatively high softening point and excellent weatherability. However, to obtain fibers having a low loss at a wavelength of at least 10 micrometers from this glass, its Te content should be made as high as possible. With increasing Te content, however, the glass forming region of this glass composition becomes extremely narrow and the glasses in this region become unstable to crystallization. Instability to crystallization leads to a higher possibility of precipitation of small crystalline particles during fiberization of the glass. The glass fibers may break starting at these small crystalline particles, or undergo scattering loss.

It is an object of this invention to remove the aforesaid defect of the prior art, and to provide a chalcogenide glass which has a large glass forming region and is stable against crystallization and suitable as a material for infrared fibers having excellent infrared transmission characteristics.

The above object is achieved in accordance with this invention by a chalcogenide glass having the following composition in atomic %:

Tl: 0.5–47
Ge: 5–41
Se: 2–58
Te: 5–75
Tl+Ge+Se+Te: at least 80%.

In the present invention, Tl is an essential component of the glass. Tl can be included into the chalcogenide glass without reducing its thermal and chemical durability. Tl improves the infrared transmission characteristics of the glass and adjust the refractive index and viscosity of the glass.

The content of Tl in the glass of this invention is 0.5 to 47 atomic % (to be abbreviated "at %"), preferably 1 to 20 at %. The infrared transmission characteristics of the glass become better as the Tl content is higher. If, however, it exceeds the specified upper limit, the softening point of the glass is lowered. If it is below the specified lower limit, the glass becomes unstable to crystallization. Hence, Tl contents outside the specified range are undesirable.

Ge serves to increase the chemical and thermal durability of the glass. Se and Te have the function of forming the network of the glass.

The content of Ge is 5 to 41 at %, preferably 12 to 33 at %. The chemical and thermal durability and the glass transition temperature (Tg) of the glass become higher as the content of Ge is higher. If, however, the Ge content exceeds the specified upper limit, the tendency of the glass to crystallize increases. If it is lower than the specified lower limit, there is a reduced extent of increase in durability and glass transition temperature.

The content of Se is 2 to 58 at %, preferably 8 to 42 at %. If it falls outside the specified range, the glass has a lowered glass transition temperature and an increased tendency to crystallization.

The content of Te is 5 to 75 at %, preferably 40 to 65 at %. If it exceeds the specified upper limit, the glass transition temperature decreases and the tendency of the glass to crystallize increases. If it exceeds the specified upper limit, the glass has an increased tendency to crystallization and reduced infrared transmittance.

Sb, Pb, In, Bi, Sn and Mg may be incorporated in the following proportions by atomic % in the Tl-containing Ge-Se-Te glass of this invention.

Sb: 0 to 20
Pb: 0 to 10
In: 0 to 5
Bi: 0 to 5
Sn: 0 to 5
Mg: 0 to 1
Sb+Pb+In+Bi+Sn+Mg: not more than 20 at %.

Sb can be introduced without reducing the crystallization resistance of the glass. Mg is effective for removing the oxygen impurity in the glass and thus improving infrared transmission characteristics. If the contents of these additional components exceed the specified upper limits, the glass becomes unstable to crystallization, and it is difficult to obtain infrared fibers of a low loss from such glasses.

Preferably, the chalcogenide glass of this invention does not substantially contain elements other than the elements described above. It may, as required, contain up to 20 at % of the other elements. Whenever possible, components which interfere with infrared transmission or increase the tendency to crystallization should not be included in the glass of this invention. Such components are, for example, alkali metals, alkaline earth metals other than Mg, Ti, Ga, and oxygen.

To obtain glass having a reduced impurity content, raw materials having the highest possible purity, for example, at least 99.999%, should be used. High purity raw materials for use in this invention are commercially available.

It is also important to avoid inclusion of impurities into the glass from vessels and the environmental atmosphere used in the glass manufacturing process. One preferred method of achieving this is to heat and melt the raw materials in a closed quartz vessel under reduced pressure.

The present invention will further be described with reference to the accompanying drawings in which.

EXAMPLE 1

Raw materials having a purity of at least 99.999% were used to produce a chalcogenide glass in accordance with this example.

Ge (27.30g), 19.80g of Se, 100.00g of Te and 30.03g of Tl were mixed so that the resulting material would consist of 24 at % of Ge, 16 at % of Se, 50 at % of Te and 10 at % of Tl. The Ge-Se-Te-Tl mixture was put in a quartz vessel having an inside diameter of 10 mm and a length of 100 mm. The inside of the quartz vessel was evacuated to $2 \times 10^{-7}$ torr over 4 hours. Thereafter, the evacuation port of the quartz vessel was sealed up in an ampoule shape by using a gas burner.

The quartz ampoule was put in a rocking electrical furnace, heated slowly to 400° C. and maintained at this temperature for 24 hours. Thereafter, the temperature was slowly elevated to 860° C. in order to melt the raw materials. During the heat melting, the quartz ampoule was allowed to rock once every 30 seconds to homogenize the chalcogenide glass melt. The glass was then cooled gradually to 550° C. with continued rocking, and the rocking was stopped when its temperature reached 550° C. After standing for about 1 hour, the ampoule was transferred to an annealing furnace kept at 180° C., and then annealed to room temperature over the course of about 6 hours.

Figure 1:
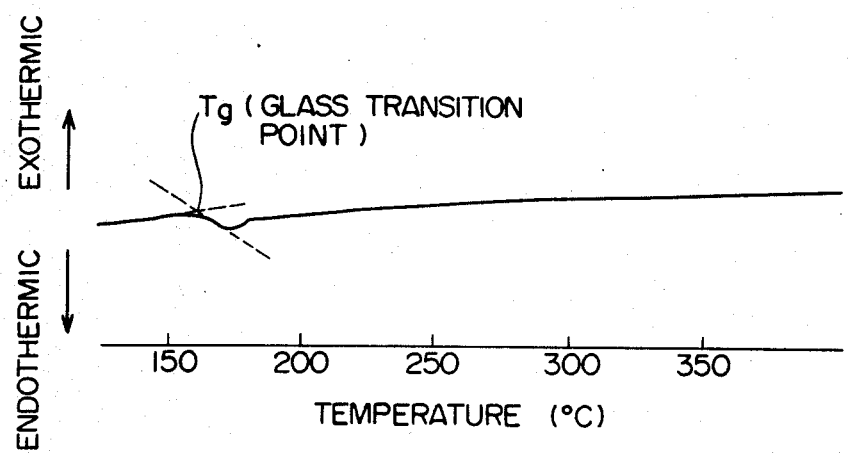
FIGS. 1 and 2 are differential thermal analysis curves of the products obtained in Example 1 and Comparative Example 1, respectively.
Figure 3:
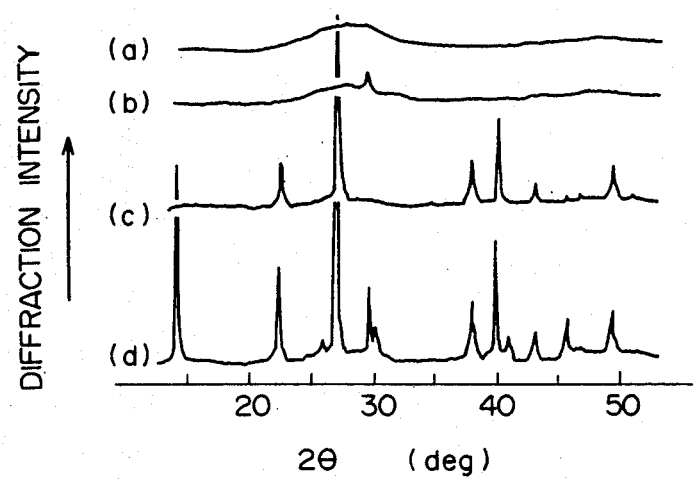
FIG. 3 is an X-ray diffraction chart in which (a), (b), (c) and (d) refer respectively to the products obtained in Example 1 and Comparative Examples 2 to 4.
Figure 4:
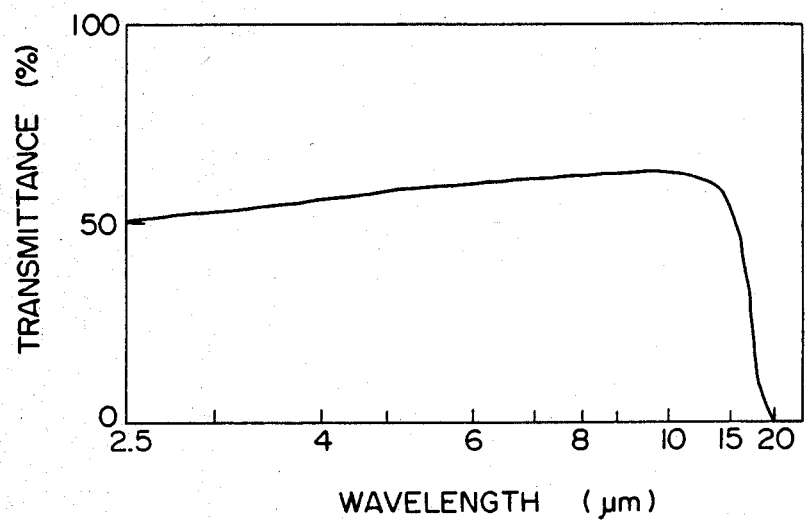
FIG. 4 is an infrared transmission characteristic diagram of the glass obtained in Example 1.

The product obtained was taken out of the ampoule, and subjected to X-ray diffractometry. Since as shown in FIG. 3, (a), its diffraction pattern did not show a sharp peak inherent to a crystal, this product was determined to be amorphous. The product was also subjected to differential thermal analysis. As shown in FIG. 1, endothermic peaks attributed to a glass transition temperature of about 157° C. and a melting point of about 340° C. were observed, but no exothermic peak due to crystallization appeared. The product was polished into a sheet glass having a thickness of 7 mm and a parallel mirror surface, and its infrared absorption specrum was measured. As shown in FIG. 4, no absorption peak was observed over a wide wavelength region from 2.5 to 14 micrometers.

When the product was left to stand in atmospheric air for more than 1 month, no change occurred in the gloss of its surface.

EXAMPLES 2 to 29

In each run, raw materials having a purity of at least 99.999% were used as in Example 1.

Ge-Se-Te-Tl or Ge-Se-Te-Tl-(Sb, Pb, In, Bi, Sn or Mg) were mixed in such proportions that the composition of the resulting material would be as shown in Table 1 were sealed up in a quartz ampoule having an internal pressure of $2 \times 10^{-7}$ torr as in Example 1. The raw materials were melted and annealed by the same procedure as in Example 1 to give the desired product having the composition shown in Table 1.

The products obtained in Examples 2 to 29 were each subjected to X-ray diffractometry. Since no sharp peak inherent to a crystal was observed in the diffraction patterns of these materials, it was confirmed that the products obtained in Exampels 2 to 29 were amorphous. When these products were subjected to differential thermal analysis, glass transition temperatures were clearly observed. These glass transition points are shown in Table 1. When these products were examined for infrared transmission characteristics by the same method as in Example 1, they were found to be transparent over a wavelength region of 2.5 to 14 micrometers. Furthermore, these products had weatherability equivalent to that of the product obtained in Example 1.

TABLE 1

| Example | | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| Glass | Ge | 24 | 24 | 24 | 18 | 16 | 15 | 20 | 19 | 21 | 23 | 10 | 20 | 22 | 25 | 15 | 25 | 10 | 30 | 15 |
| com- | Se | 16 | 10 | 13 | 9 | 8 | 8 | 5 | 13 | 16 | 18 | 5 | 10 | 18 | 20 | 15 | 25 | 20 | 30 | 45 |
| ponents | Te | 50 | 60 | 55 | 70 | 70 | 60 | 60 | 60 | 55 | 55 | 50 | 50 | 50 | 50 | 40 | 40 | 30 | 30 | 30 |
| (at %) | Tl | 10 | 6 | 8 | 3 | 6 | 17 | 15 | 8 | 8 | 4 | 35 | 20 | 10 | 5 | 30 | 10 | 40 | 10 | 10 |
| | Sb | | | | | | | | | | | | | | | | | | | |
| | Pb | | | | | | | | | | | | | | | | | | | |
| | In | | | | | | | | | | | | | | | | | | | |
| | Bi | | | | | | | | | | | | | | | | | | | |
| | Sn | | | | | | | | | | | | | | | | | | | |
| | Mg | | | | | | | | | | | | | | | | | | | |
| Tg (°C.) | | 157 | 154 | 150 | 135 | 121 | 114 | 136 | 140 | 144 | 163 | 74 | 133 | 152 | 182 | 113 | 180 | 88 | 183 | 123 |

| Example | | 20 | 21 | 22 | 23 | 24 | 25 | 26 | 27 | 28 | 29 |
|---|---|---|---|---|---|---|---|---|---|---|---|
| Glass | Ge | 40 | 15 | 18 | 15 | 25 | 25 | 25 | 25 | 24 | 26.5 |
| com- | Se | 25 | 55 | 55 | 45 | 11 | 15 | 15 | 15 | 16 | 18 |
| ponents | Te | 20 | 20 | 10 | 20 | 50 | 50 | 50 | 50 | 50 | 55 |
| (at %) | Tl | 15 | 10 | 17 | 5 | 7 | 7 | 7 | 7 | 9.5 | 0.5 |
| | Sb | | | | 15 | | | | | | |
| | Pb | | | | | 7 | | | | | |
| | In | | | | | | 3 | | | | |
| | Bi | | | | | | | 3 | | | |
| | Sn | | | | | | | | 3 | | |

TABLE 1-continued

| | | | | | | | | | | |
|---|---|---|---|---|---|---|---|---|---|---|
| Mg | | | | | | | | | 0.5 | |
| Tg (°C.) | 130 | 250 | 99 | 220 | 209 | 180 | 179 | 185 | 150 | 188 |

COMPARATIVE EXAMPLE 1

Figure 2:
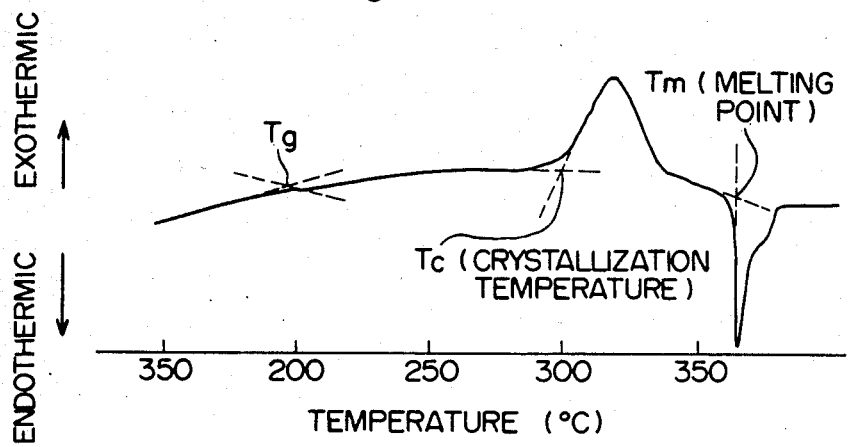

Ge, Se and Te raw materials having similar purities to the raw materials in Example 1 were formulated so as to provide a final glass composition consisting of 26 at % of Ge, 19 at % of Se and 55 at % of Te, and sealed up in a quartz ampoule having an internal pressure of $2 \times 10^{-7}$ torr. They were melted and annealed by the same procedure as in Example 1 to obtain a product having the desired composition. X-ray diffractometry of the resulting product showed show no sharp peak inherent to a crystal. When the product was subjected to differential thermal analysis, an exothermic peak due to crystallization was observed at 300° to 350° C., as shown in FIG. 2.

COMPARATIVE EXAMPLES 2-8

Raw materials having similar purities to the raw materials in Example 1 formulated so as to provide each of the final glass compositions shown in Table 2 were sealed up in a quartz ampoule having an internal pressure of $2 \times 10^{-7}$ torr, and melted and annealed by the same procedure as in Example 1 to obtain products having the desired compositions.

When the resulting products were each subjected to X-ray diffractometry, a sharp peak ascribable to a crystal was observed. As typical examples, the X-ray diffraction patterns of the products obtained in Comparative Examples 2, 3 and 4 are shown in (b), (c) and (d) in FIG. 3.

These products did not at all permit passage of infrared rays having a wavelength of 2 to 25 micrometers.

TABLE 2

| Comparative Example | | 1 | 2 | 3 | 4 | 5 | 6 | 7 | 8 |
|---|---|---|---|---|---|---|---|---|---|
| Glass components (at %) | Ge | 26 | 13 | 22 | 25 | 0 | 50 | 10 | 2 |
| | Se | 19 | 5 | 0 | 63 | 40 | 15 | 5 | 60 |
| | Te | 55 | 80 | 60 | 2 | 20 | 20 | 30 | 30 |
| | Tl | 0 | 2 | 18 | 10 | 40 | 15 | 55 | 8 |

As described hereinabove, the Tl-containing Ge-Se-Te chalcogenide glass of this invention has a larger glass forming region than the conventional Ge-Se-Te glasses, and contained a composition range which does not crystallize as far as it is observed by differential thermal analysis. Furthermore, since the glass of this invention permits passage of infrared rays having a broad wavelength region of 2.5 to 14 micrometers, $CO_2$ laser light (wavelength 10.6 micrometers) can easily pass through it.

When the glass of this invention is used, for example, in a wave guide for temperature measurement, the measurement of low temperatures can be carried out especially efficiently.

What is claimed is:

1. A chalcogenide glass having the following composition in atomic %:
   Tl: 0.5-47
   Ge: 5-41
   Se: 2-58
   Te: 5-75
   Tl+Ge+Se+Te: at least 80%.

2. The chalcogenide glass of claim 1 having the following composition in atomic %:
   Tl: 1-20
   Ge: 12-33
   Se: 8-42
   Te: 40-65.

3. The chalcogenide glass of claim 1 or 2 further containing the following components in atomic %:
   Sb: 0-20
   Pb: 0-10
   In: 0-5
   Bi: 0-5
   Sn: 0-5
   Mg: 0-1
   Sb+Pb+In+Bi+Sn+Mg: not more than 20%.

* * * * *